United States Patent [19]

Hogge

[11] Patent Number: 5,630,123
[45] Date of Patent: May 13, 1997

[54] SOFTWARE SYSTEM UTILIZING A FILTERED PRIORITY QUEUE AND METHOD OF OPERATION

[75] Inventor: John C. Hogge, Richardson, Tex.

[73] Assignee: i2 Technologies, Inc., Dallas, Tex.

[21] Appl. No.: 314,073

[22] Filed: Sep. 28, 1994

[51] Int. Cl.$^6$ ............................................. G06F 7/24
[52] U.S. Cl. ...................... 395/607; 395/612; 395/673
[58] Field of Search ..................... 364/401; 395/800, 395/700, 607

[56] References Cited

U.S. PATENT DOCUMENTS

| | | | |
|---|---|---|---|
| 4,209,845 | 6/1980 | Berger et al. | 364/900 |
| 4,459,663 | 7/1984 | Dye | 364/200 |
| 4,611,280 | 9/1986 | Linderman | 364/300 |
| 4,611,310 | 9/1986 | Durbin | 365/230 |
| 4,642,756 | 2/1987 | Sherrod | 364/200 |
| 4,827,423 | 5/1989 | Beasley et al. | 364/468 |
| 5,089,970 | 2/1992 | Lee et al. | 364/468 |
| 5,148,370 | 9/1992 | Litt et al. | 364/468 |
| 5,175,857 | 12/1992 | Inoue | 395/800 |
| 5,216,612 | 6/1993 | Cornett et al. | 364/468 |
| 5,218,700 | 6/1993 | Beechick | 395/700 |
| 5,233,533 | 8/1993 | Edstrom et al. | 364/468 |
| 5,280,425 | 1/1994 | Hogge | 364/402 |
| 5,303,144 | 4/1994 | Kawashima et al. | 364/401 |
| 5,333,318 | 7/1994 | Wolf | 395/600 |
| 5,369,570 | 11/1994 | Parad | 364/401 |
| 5,432,887 | 7/1995 | Khaw | 395/11 |
| 5,524,077 | 6/1996 | Faaland et al. | 364/402 |

FOREIGN PATENT DOCUMENTS

| | | |
|---|---|---|
| 0231552A1 | 8/1987 | European Pat. Off. . |
| 0466089A2 | 1/1992 | European Pat. Off. . |
| 0466090A2 | 1/1992 | European Pat. Off. . |

Primary Examiner—Kevin A. Kriess
Assistant Examiner—Lucien Toplu
Attorney, Agent, or Firm—Baker & Botts, L.L.P.

[57] ABSTRACT

A software system (2) utilizing a filtered priority queue (10) is provided. A filtering module (4) is operable to access a plurality of data records of entities (16, 18, 20, 22, 24, 26 and 28) of a priority queue and to filter and arrange the data records in a memory storage device (8) to form the filtered priority queue (10). The filtered priority queue (10) comprises a remaining set (12) and a filtered set (14). The filtered set (14) contains a first subset of data records (20, 22, 24, 26, and 28). The first subset of data records (20, 22, 24, 26, and 28) form sublevels of a lattice. The remaining set (12) contains a second subset of data records (16 and 18). The second subset of data records (16 and 18) comprise lattice heads of the lattice. A sorting module (6) is coupled to the filtering module (4). The sorting module (6) is operable to access the remaining set (12) and to order the data records (16 and 18) in the second subset of data records to identify a data record (16) of a most critical entity.

22 Claims, 1 Drawing Sheet

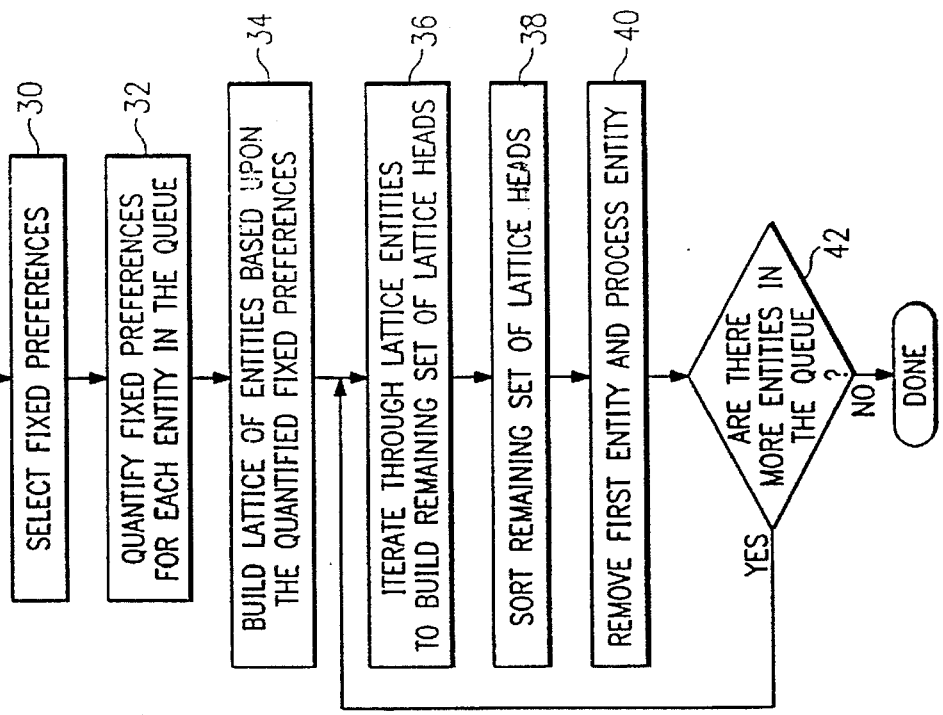
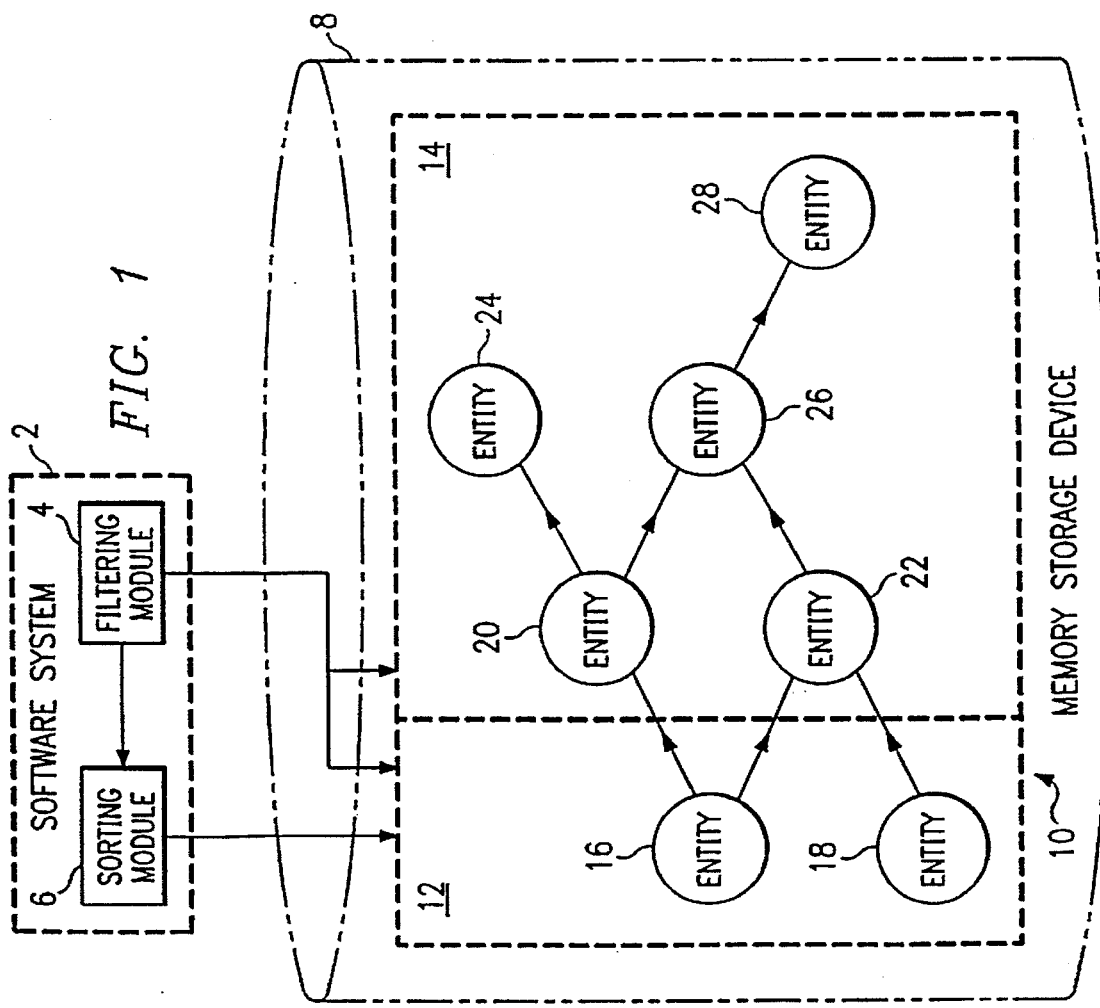

SOFTWARE SYSTEM UTILIZING A FILTERED PRIORITY QUEUE AND METHOD OF OPERATION

TECHNICAL FIELD OF THE INVENTION

This invention relates in general to the field of electronic systems, and more particularly to a software system utilizing a filtered priority queue and method of operation.

BACKGROUND OF THE INVENTION

Conventional software systems often utilize a priority queue of entities sorted by some set of comparison criteria. The entities may represent tasks that a software system must perform or data that a software system must process. The priority queue is utilized to order those tasks. The entity at the top of the priority queue is the most critical entity. This entity represents the task that the software system should perform next. A software system utilizing the priority queue removes the most critical entity from the priority queue and executes tasks appropriate to that entity. The software system then resorts the priority queue listing the remaining entities in order of importance. The most critical entity again occupies the top spot of the priority queue.

A variety of sorting mechanisms are utilized in conventional software systems to sort entities in the priority queue. Two such sorting mechanisms are referred to as a quick sort and a heap sort. These conventional sorts rank all of the entities of the priority queue in order from the most to the least critical. The sorting criteria generally depends on fixed characteristics of the entities defined as appropriate for the tasks represented by the entities. The fixed characteristics might be such things as a product number, a due date, a quantity, manufacturing costs, and profit margin with respect to a priority queue of entities representing orders for goods produced by a manufacturing plant. Sorting criteria can include nonfixed preferences that change during the time in which the software system processes the priority queue and performs tasks. For example, a software system may prefer entities of a second type for a certain period of time after processing an entity of a first type.

Resorting the priority queue after each critical entity is removed is expensive and time consuming. This is especially true with respect to priority queues that utilize non-fixed preferences in the sorting criteria.

An alternative method of ordering entities is a lattice structure rather than a sorted queue. Some software systems build a lattice placing some entities in order with respect to one another but not sorting all entities. These software systems can perform a general lattice vertex removal that determines lattice heads after the removal of a lattice entity. However, the lattice of these systems does not provide an indication of the most critical entity.

SUMMARY OF THE INVENTION

Accordingly, a need has arisen for a software system utilizing an improved priority queue and method of operation that reduces the time and expense required to sort the entities in the priority queue.

In accordance with the present invention, a software system utilizing a filtered priority queue and method of operation is provided that substantially eliminates or reduces disadvantages and problems associated with conventional priority queues and methods of sorting priority queues.

According to one embodiment of the present invention, a software system utilizing a filtered priority queue is provided. A filtering module is operable to access a plurality of data records of entities of a priority queue and to filter and arrange the data records in a memory storage device to form the filtered priority queue. The filtered priority queue comprises a remaining set and a filtered set. The filtered set contains a first subset of data records. The first subset of data records form sublevels of a lattice. The remaining set contains a second subset of data records. The second subset of data records comprise lattice heads of the lattice. A sorting module is coupled to the filtering module. The sorting module is operable to access the remaining set and to order the data records in the second subset of data records to identify a data record of a most critical entity.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein:

FIG. 1 illustrates a software system utilizing a filtered priority queue constructed according to the teachings of the present invention; and FIG. 2 illustrates a flow chart of a method of filtering and sorting a priority queue according to the teachings of the present invention.

DETAILED DESCRIPTION OF THE INVENTION

The teachings of the present invention are applicable to software systems utilizing priority queues to order entities representing tasks needing to be performed. The entities comprise data records stored and arranged in a memory storage device. The software systems operate on computer hardware systems able to access data records, move data records into processing memory and perform processing steps on the data records as described herein. The present invention reduces the time and expense of ordering the entities to identify a most critical entity.

FIG. 1 illustrates a software system 2 utilizing a filtered priority queue constructed according to the teachings of the present invention. Software system 2 includes a filtering module 4 coupled to a sorting module 6. Filtering module 4 and sorting module 6 are coupled to a memory storage device 8. Memory storage device 8 holds a filtered priority queue 10. Filtering module 4 accesses all entities in filtered priority queue 10, and sorting module 6 accesses only those entities held in a remaining set 12.

Filtered priority queue 10 comprises remaining set of entities 12 and a filtered set of entities 14. The entities comprise data records stored in memory storage device 8. The entities in filtered priority queue 10 are arranged in memory storage device 8 in a lattice as shown. Remaining set 12 includes the lattice heads. Filtered set 14 includes all entities that are not lattice heads.

Remaining set 12 includes entity 16 and entity 18. Entity 16 and entity 18 are lattice heads. Filtered set 14 includes three sublevels of the lattice. Entity 20 and entity 22 occupy a first sublevel, entity 24 and entity 26 occupy a second sublevel, and entity 28 occupies a third sublevel. The entities in filtered priority queue 10 are interrelated as shown by the lattice structure.

Filtered priority queue 10 includes entities representing tasks that software system 2 must perform. Software system 2 utilizes filtered priority queue 10 to determine which of the entities is the most critical entity and should be removed next from filtered priority queue 10. The most critical entity is that entity in filtered priority queue 10 that is most important according to defined sorting criteria.

Filtering module 4 operates to generate the lattice structure of filtered priority queue 10. Filtering module 4 filters and arranges the data records of the entities in memory storage device 8 according to defined sorting criteria. After filtering module 4 filters and arranges the data records, filtered set 14 comprises a subset of filtered priority queue 10 containing all entities that do not need to be sorted because they cannot comprise the most critical entity. Remaining set 12 comprises a subset of the entities in filtered priority queue 10 that might comprise the most critical entity.

Sorting module 6 operates to order the entities in remaining set 12 according to a sort based upon the defined sorting criteria. Sorting module 6 also utilizes additional criteria to resolve any ambiguities or ties. As shown, entity 16 is the most critical entity, and entity 18 is the next most critical after entity 16. The entities in filtered set 14 are ordered from one sublevel to the next, but are not ordered with respect to all entities in the same sublevel.

A technical advantage of the present invention is that software system 2 determines the most critical entity by sorting the entities in remaining set 12 rather than sorting all of the entities in filtered priority queue 10. This sorting operation more quickly determines the most critical entity because remaining set 12 always comprises the same or fewer number of entities than the entire filtered priority queue 10.

Defined sorting criteria is utilized to determine the lattice structure of filtered priority queue 10 and to determine which entities are members of remaining set 12. The defined sorting criteria comprises a number of fixed preferences quantified for each entity and included as data in the relevant data record. For example, if the system of the present invention were used in a manufacturing scheduling application, a fixed preference may comprise the manufacturing cost or the profit margin of a particular product manufactured at a manufacturing factory. The sorting criteria may also include variable or dynamic preferences that change with respect to time.

Filtering module 4 determines the relationship between the entities in remaining set 12 and filtered set 14 based upon the fact that, for any two entities, the second is known not to be the most critical entity if the first has higher values for all fixed preferences. In other words, if the quantities for the fixed preferences associated with the first entity are greater than those associated with the second entity for all of the fixed preferences in the defined sorting criteria, the second entity cannot be the most critical entity. This is true because the first entity necessarily would be located in front of the second entity if all of the entities in the priority queue were sorted.

In one embodiment of the present invention, filtered priority queue 10 includes entities representing orders for products manufactured by a factory. In this embodiment, an order having lower manufacturing cost and higher profit margin is preferred. Therefore, the most critical entity is that entity representing an order having the lowest manufacturing cost and highest profit margin. According to the teachings of the present invention, the entities are filtered and sorted according to these fixed preferences.

If these fixed preferences were utilized to generate filtered priority queue 10, entity 16 represents an order having a lower manufacturing cost and higher profit margin than both entity 20 and entity 22. Similarly, entity 18 has a lower manufacturing cost and higher profit margin than entity 22. Entity 20 is more preferred in both preferences than entity 24 and entity 26, and entity 22 is more preferred than entity 26. Finally, entity 26 is more preferred than entity 28. Only entity 16 or entity 18 could comprise the most critical entity because only these two entities are not less preferred with respect to another entity. In this embodiment, the most critical entity is determined by sorting entity 16 and entity 18 rather than sorting all seven entities.

The present invention provides a benefit for any application of a priority queue where fixed preferences are more important than variable preferences to determining the most critical entity. This invention is also advantageous involving variable preferences that do not change often during processing of the priority queue. In such a case, the stable variable preferences can be treated as fixed preferences. Whenever the quantities of the variable preferences associated with an entity change, the lattice structure of the filtered priority queue must be reconstructed.

FIG. 2 illustrates a flow chart of a method of filtering and sorting a priority queue according to the teachings of the present invention. The method is performed by a software system operating to order entities comprising data records in a memory storage device.

Fixed preferences representing defined sorting criteria are selected in step 30. The fixed preferences can comprise any quantifiable parameter associated with each of the entities in the priority queue. The fixed preferences are included in the data record of each entity. In a manufacturing scheduling environment, these fixed preferences might include data associated with an order for products. In step 32, the software system quantifies the fixed preferences for each entity in the priority queue. A lattice structure ordering the entities in the memory storage device is then built forming a filtered priority queue in step 34 based upon the quantified fixed preferences of all the entities. In one embodiment of the present invention, the lattice is structured such that an entity that is preferred over a second entity according to every one of the fixed preference is placed ahead of the second entity in the lattice. FIG. 1, described above, illustrates a filtered priority queue having such a lattice structure. Each entity in a sublevel of the lattice has at least one fixed preference for which it is preferred over another entity in that sublevel. Thus, entities occupying the same sublevel of the lattice are not ordered with respect to one another.

After the lattice of the filtered priority queue is built, the software system identifies a remaining set of lattice heads, in step 36. The software system might iterate through the lattice entities, or the lattice data structure in the storage device may provide access to the lattice heads such as in a linked list. The lattice heads are those entities not following another entity in the lattice. The remaining set of lattice heads is sorted in step 38 according to the fixed preferences. Any ambiguities or ties are resolved utilizing additional criteria. In step 40, the first entity determined by the sort is removed from the priority queue and processed. This first entity comprises the most critical entity. The priority queue is then checked in step 42 for additional entities. If there are additional entities, the software system continues at step 36. If there are no more entities in the priority queue, then the software system has completed processing entities.

The priority queue is filtered and sorted in this manner. The lattice structure of the filtered priority queue is constructed by filtering the entities according to the fixed preferences associated with the entities. As shown in FIG. 1, the lattice comprises a directed graph of vertices and edges with no cycles. Each vertex has zero or more edges coming into it and zero or more edges going out of it. The entities comprise the vertices of the lattice. The edges of the lattice are determined by a function of the fixed preferences quantified with respect to each entity as described above. A first entity precedes a second entity in the lattice only if the first entity is preferred in all of the fixed preferences over the second entity. Not every pair of entities in the priority queue must be compared in filtering the priority queue to form the lattice. The worst case performance for N entities is that $((N^2 \div 2)+N)$ must be compared. The typical case performance is much better. In the best possible case, only N comparisons must be made.

As shown in FIG. 1, filtered set 14 of filtered priority queue 10 comprises those entities that are preceded by other entities in the lattice. Remaining set 12 comprises those entities that are lattice heads and have no preceding entities. Only the entities in remaining set 12 of entities need to be sorted to determine the most critical entity according to the teachings of the present invention. Filtered set 14 is efficiently updated by looping through the edges leading from a removed most critical entity to other entities after the most critical entity is removed. Any entities that were preceded only by the removed entity become members of remaining set 12 because they become lattice heads.

A technical advantage of the present invention is a reduction in the number of entities that must be sorted in a priority queue to determine a most critical entity due to the filtering of the priority queue. The present invention provides a decrease in the amount of time required to resort the priority queue due to this identification of a subset of entities known not to be the most critical entity. This filtered set is removed from sorting, and only the remaining entities are sorted to determine the most critical entity.

Another technical advantage of the present invention is the fact that when the most critical entity is removed from the priority queue, the remaining set of lattice heads is efficiently recomputed and resorted without having to sort all of the entities. A further technical advantage of the present invention is that filtering the priority queue to determine a remaining set of lattice heads makes efficient use of fixed preferences as sorting criteria.

One embodiment of the present invention comprises a software system utilizing a filtered priority queue for manufacturing planning and scheduling systems having entities representing orders for products. The orders consist primarily of a part number, quantity, and due date and are associated with zero or more fixed preferences.

The fixed preferences, in this embodiment, comprise a set of functions that rate the importance for the factory to meet the due date of each order. The fixed preferences can vary according to the priorities of each factory. In this embodiment, the due date is utilized as one of the fixed preferences. An order due tomorrow may be preferred over an order due a month later because there is time to make adjustments such that the later order can be accommodated. Another fixed preference utilized in this embodiment is the quantity ordered. Small orders might be preferred over large orders. A further fixed preference utilized in this embodiment is a customer priority factor reflecting the customer's current attitude or need for parts. An additional fixed preference utilized is the manufacturing cost of the product. It may be preferred to build those orders that are less expensive.

In this manufacturing environment, a bill of materials comprises a list of the parts needed to build the manufactured product. Order plans comprise the tree of built parts according to the bill of materials and comprise the part reservations supplying any parts which are not built.

In a manufacturing environment, the fixed preferences utilized according to the teachings of the present invention to filter and sort the priority queue are determined from the factory goals. Planning for a factory comprises a process of developing order plans and schedules for the factory. A plan may schedule some orders late because the part inventory is not always sufficient to satisfy the plans of all orders. Planning can have various formulations for goals, but generally the goal is to minimize the number of late orders or the total order lateness.

The present invention provides advantages in prioritizing orders received by a factory. When comparing two orders for the same part, it may be more critical to plan the one having greater values for all of its fixed preferences. For example, a first order may be preferred over a second order if the first order has an earlier due date, smaller quantity, and higher customer priority. However, if the second order had a higher customer priority, then neither of the two orders necessarily is preferred over the other. A filtered priority queue is constructed using these relationships according to the teachings of the present invention.

In this embodiment having entities representing manufacturing orders, the fixed preferences may be based upon the due date, quantity, and customer priority factor. The order having an earlier due date should be planned first to reduce the chance of missing a due date due to shortage of inventory or machine capacity. The order having a smaller quantity is the easiest to satisfy and should be planned first. Plans often are more productive in terms of satisfying order quantities and due dates when smaller orders are filled first. Furthermore, when resources are scarce, satisfying multiple small quantity orders may be preferable to satisfying one large quantity order because more customers are satisfied. This, of course, could depend upon the goals of planning. Finally, the order having a higher customer priority factor should be planned first. In comparing two orders, if one customer is rated as more important, then it is better to assign that customer scarce inventory over assignment to another less important customer.

A "same part" restriction can be helpful as a fixed preference identifying orders for the same part. Orders for the same part require the same resources and inventory although in differing quantities. It is difficult to know whether a first order due in one week should be planned before a second order due in two weeks if the two orders are for different parts. The second order might have a long manufacturing lead time such that it requires resources before the first order. On the other hand, if the first order and the second order are for the same part, the first order is known to need resources before the second order. A "same part" restriction provides an indication as to which orders are comparable in terms of fixed preferences because the orders have the same manufacturing process.

In this embodiment of the present invention, a priority queue having a relatively large number of entities each representing orders is filtered and sorted to determine the most critical order. This determination of the most critical order is made more efficient by filtering the orders according to the teachings of the present invention. A priority queue is created for every end item part in the manufacturing environment. Each priority queue is then populated with entities representing the orders for the part needing to be planned or scheduled. Each priority queue is filtered to produce a filtered priority queue having a lattice comprising a filtered set and a remaining set of orders according to the teachings of the present invention. The orders in the remaining set of the lattice heads have no orders preceding them and are those worth considering to plan or schedule next as most critical orders. The next order processed is the most critical order depending upon defined sorting criteria. Processing efficiency is greatly increased according to the technical advantages of the present invention because only those orders in the remaining set are sorted. The remaining set is always equal to or smaller in number than the total number of entities in the priority queue. After an order in the remaining set is processed, the order is removed from the filtered priority queue. The priority queue is then refiltered and the remaining set resorted.

A technical advantage of the present invention is the great reduction in the number of orders that must be compared in choosing the next order to plan or schedule. At any given time, fewer orders must be compared than with conventional priority queue sorts. The overhead of updating the filtered priority queue lattice is small compared to potential computations required to compare all of the orders to sort the entire priority queue.

Although the present invention has been described in part with reference to a software system used to schedule a manufacturing operation, this embodiment is described solely for purposes of teaching the advantages of the present invention. The present invention benefits any software system utilizing a priority queue to sort entities. In particular, the present invention benefits systems that plan and schedule machines, tools, work crews, resources, routings, operations of routings, or any other entity in presenting a planning or scheduling problem.

Although the present invention has been described in detail, it should be understood that various changes, substitutions and alterations can be made hereto without departing from the spirit and scope of the invention as defined by the appended claims.

What is claimed is:

1. A software system utilizing a filtered priority queue to identify a most critical entity from a plurality of entities, comprising:
   a plurality of data records stored in a memory storage device, each data record representing one of a plurality of entities from which a most critical entity is to be identified based upon defined sorting criteria;
   a filtering module operable to access the plurality of data records and to arrange the data records to form a filtered priority queue based upon a first part of the sorting criteria, the filtered priority queue being a lattice where each data record in the lattice is more critical than those data records it is positioned ahead of based upon the first part of the sorting criteria, such that the lattice comprises:
      a filtered set of data records containing those data records that are positioned in sublevels of the lattice; and
      a remaining set of data records containing those data records that are lattice heads of the lattice; and
   a sorting module coupled to the filtering module, the sorting module operable to access the remaining set of data records and to order data records in the remaining set of data records based upon a second part of the defined sorting criteria, where a highest ordered data record from the remaining set is identified as representing the most critical entity.

2. The software system of claim 1, wherein the first part of the defined sorting criteria comprises positioning a first data record ahead of a second data record in the lattice only if the first data record beats the second data record in all of a plurality of fixed preferences associated with the represented entity.

3. The software system of claim 2, wherein the second part of the defined sorting criteria comprises ordering the remaining set of data records as a function of the plurality of fixed preferences where the data records are known not to beat one another in all of the fixed preferences.

4. The software system of claim 3, wherein the second part of the defined sorting criteria further comprises ordering the remaining set of data records based upon variable preferences that change with time.

5. The software system of claim 2, wherein the plurality of entities comprise a plurality of unique tasks to be performed and the plurality of fixed preferences define characteristics of each unique task.

6. The software system of claim 5, wherein each of the plurality of unique tasks comprises planning an order for a product to be manufactured by a factory.

7. The software system of claim 6, wherein the second part of the defined sorting criteria comprises ordering the remaining set of data records as a function of the plurality of fixed preferences, where the data records are known not to beat one another in all of the fixed preferences.

8. The software system of claim 7, wherein the second part of the defined sorting criteria further comprises ordering the remaining set of data records based upon variable preferences that change with time.

9. The software system of claim 6, wherein the plurality of fixed preferences associated with each unique task define characteristics of planning each order.

10. The software system of claim 9, wherein the fixed preferences comprise a quantity ordered, a due date and a customer priority factor associated with each order.

11. A method of operating a software system to filter and sort a plurality of data records representing a plurality of entities to identify a most critical entity, comprising:
   storing a plurality of data records in a memory storage device, each data record representing one of a plurality of entities from which a most critical entity is to be identified based upon defined sorting criteria;
   arranging the plurality of data records to build a lattice interrelating the plurality of data records based upon a first part of the sorting criteria, where each data record in the lattice is more critical than those data records it is positioned ahead of based upon the first part of the sorting criteria;
   identifying a remaining set of data records containing those data records that are lattice heads and identifying a filtered set of data records containing those data records that are positioned in sublevels of the lattice; and
   sorting the remaining set of data records, based upon a second part of the defined sorting criteria, to identify a highest ordered data record from the remaining set as representing the most critical entity.

12. The method of claim 11, wherein the first part of the defined sorting criteria comprises positioning a first data record ahead of a second data record in the lattice only if the first data record beats the second data record in all of a plurality of fixed preferences associated with the represented entity.

13. The method of claim 12, wherein the second part of the defined sorting criteria comprises ordering the remaining set of data records as a function of the plurality of fixed preferences in which the data records are known not to beat one another in all of the fixed preferences.

14. The method of claim 13, wherein the second part of the defined sorting criteria further comprises ordering the remaining set of data records based upon variable preferences that change with time.

15. The method of claim 12, further comprising selecting, quantifying and storing the plurality of fixed preferences associated with each entity.

16. The method of claim 12, wherein the plurality of entities comprise a plurality of unique tasks to be performed.

17. The method of claim 16, wherein each unique task comprises planning an order for a product manufactured by a factory.

18. The method of claim 17, wherein the plurality of fixed preferences associated with each unique task define characteristics of planning each order.

19. The method of claim 18, wherein the fixed preferences comprise a quantity ordered, a due date and a customer priority factor associated with each order.

20. A method of operating a software system to process a plurality of data records each representing an order for products to be manufactured, comprising:

storing a plurality of data records in a memory storage device, each data record representing an order for products to be manufactured;

arranging the plurality of data records to build a lattice interrelating the plurality of data records based upon a plurality of fixed preferences by positioning a first data record ahead of a second data record in the lattice only if the first data record beats the second data record in all the plurality of fixed preferences, where the fixed preferences define characteristics of each order;

identifying a remaining set of data records containing those data records that are lattice heads and identifying a filtered set of data records containing those data records that are positioned in sublevels of the lattice;

sorting the remaining set of data records to identify a highest ordered data record from the remaining set as representing a most critical order, where the remaining set of data records is ordered as a function of the plurality of fixed preferences where the data records are known not to beat one another in all of the fixed preferences;

removing the data record of the most critical order from the lattice;

planning manufacture of the most critical order; and repeating the steps of identifying, sorting, removing and planning until each data record in the plurality of data records is processed.

21. The method of claim 20, wherein the plurality of fixed preferences associated with each order are define characteristics of planning the order.

22. The method of claim 21, wherein the fixed preferences comprise a quantity ordered, a due date and a customer priority factor associated with each order.

* * * * *